3,322,767
THAM SALTS
Gabriel G. Nahas, 114 Chestnut St.,
Englewood, N.J. 07631
No Drawing. Continuation of application Ser. No. 284,845, June 3, 1963. This application Apr. 25, 1966, Ser. No. 545,168
5 Claims. (Cl. 260—258)

This application is a continuation of copending application Ser. No. 284,845, filed June 3, 1963, which is now abandoned.

This invention relates to novel therapeutic agents which are acid salts of tris (hydroxymethyl) aminomethane, referred to hereinafter as THAM and THAM metallic complexes.

My own United States Patent No. 3,055,805 relates to the use of THAM in the treatment of acidosis.

The THAM active ingredient in carrying out the invention of my own aforementioned patent may be in the form of the free base, or, in the form of an acid salt (citrate, acetate, lactate) thereof, which releases the free base and the ionized amine in the body. Furthermore, when THAM is administered as a free salt it rapidly combines with the acids (carbonic acid, lactic acid, citric acid) present in the circulating blood to form salts (bicarbonate, lactate or citrate). Examples of acid salts conventionally used as pharmacologically acceptable acid salts of therapeutically active amine buffers for release of the free amine base or of the ionized amine in the body are: inorganic acid salts such as, for example, the hydrogen chloride, sulfate and phosphate salts, and organic acid salts, for example, as acetate, citrate, lactate or pyruvate salts.

The above mentioned salts can be prepared as outlined below, by mixing an adequate amount of THAM base to the acid in an appropriate molar ratio. The THAM salt is next precipitated at an optimal pH in the proper solvent. THAM base can be added to the salt in order to obtain a solution of optimal pH for the condition to be treated. These salts can be administered either intravenously or orally in the treatment of various forms of acid-base balance disturbances.

For example: THAM hydrochloride $$[(CH_2OH)_3CNH_2 \cdot HCl]$$

is prepared by adding 100 ml. of 3 molar THAM to 22 ml. of 10 HCl. At pH 4.0 a precipitate is obtained and the salt is extracted with ethanol. This is a white crystal salt soluble in water (100%). THAM base is added to pH 7.0–8.0. This salt may be used in the treatment of hypochloremic alkalosis. It may be administered orally as a 500 mg. tablet, as a syrup or intravenously as a 0.3 molar sterile solution at pH 7.40. THAM phosphate $$[(CH_2OH)_3CNH_2 \cdot H_3PO_4]$$

is prepared by mixing 100 ml. of 3 M THAM with 22 ml. of 17 molar $H_3PO_4$. At pH 4.50 a precipitate is formed. The salt is extracted with ethanol. This is a white crystal salt soluble in water (100%). THAM base may be added to adjust pH to 7.0–8.0. This compound could be used orally as a gastric antacid as a syrup or a tablet alone or in combination with other salts.

THAM sulfate $[(CH_2OH)_3CNH_2 \cdot H_2SO_4]$ is prepared by adding 50 ml. of 6 M THAM to 9 ml. of 36.7 N $H_2SO_4$. The solution is heated to 80° to dissolve the THAM, and then cooled. The salt is then extracted with ethanol. THAM base may be added to pH 6.0. This salt could be used as a laxative in a tablet or a syrup.

Weak organic acids will also form salts with THAM, for instance THAM acetate $$[(CH_2OH)_3CNH_2 \cdot CH_3COOH]$$

One molar anhydrous acetic acid solution (60 gm./l.) is added to one molar THAM solution (12 gm./l.) in equimolar amounts. This mixture is heated to 100° C. for 3 minutes and cooled in an ice salt mixture. The precipitate appears at 5–10° C. This crystal is hydroscopic at room temperature. THAM base can be added to a solution of this salt to pH 8.40. Therapeutic use as a gastric antacid and to alkalinize the urine. Administration by mouth of this solution flavored with a sugar syrup, 8–12 gm. daily to produce an alkaline urine.

THAM lactate $[CH_2OH)_3CNH_2 \cdot C_3H_6O_3]$ is prepared in a similar way as a syrup and has the same indications.

THAM citrate $[(CH_2OH)_3CNH_2 \cdot C_6H_8O_7H_2O]$ 4.0 gm. of citric acid anhydrous and 2.2 gm. of THAM are dissolved in 50%–50% ethanol-ether mixture. The mixture is cooled at 4° C. and a precipitate is formed. Separation is obtained by filtering through a Buchner funnel. The salt is a white crystal water soluble. THAM base can be added to a solution of this salt till pH 8.50. Therapeutic use as a gastric antacid and for alkalinization of the urine. Administration by mouth as a 20% solution flavored with cherry syrup, 6–12 gm. a day.

The aforementioned salts of THAM are what might be termed "conventional salts of THAM." In addition to these salts, however, there are THAM acid salts and THAM complex salts which may be used in the treatment of acidosis in accordance with my invention of U.S. Patent No. 3,055,805 but which, in addition, have added tributes, as will be evident from the discussion which follows. The last mentioned salts are novel compositions of matter and form the basis of the present invention.

The present invention relates to novel THAM salts formed by the combination of THAM with an acidic therapeutic agent of limited solubility in water to form a THAM salt which is readily soluble in water. The aforementioned term "water" includes body fluids. When the salts of the present invention are administered in the body, the salts breakdown into THAM and the acidic active ingredient whereby the THAM component serves in its own capacity as a antacid and the acidic component effects its own therapeutic activity. In addition, all these salts are sodium free, which is of great importance for all patients on a Na-free diet because of an underlying cardiovascular or kidney disease. The preferred method of producing the novel THAM salts of this invention is to mix an adequate amount of THAM base to the acid in an appropriate molar ratio, the THAM salt is precipitated at optimal pH in the proper solvent.

Examples of therapeutically active acidic components useful in forming novel THAM salts in accordance with this invention are salicylic acid, acetylsalicylic acid, barbituric acid, 5-ethyl-5 (1 methylbutyl)-2-thiobarbituric acid and ascorbic acid. The following are examples of novel THAM salts, the optimal pH for administration of such salts and their therapeutic utility.

EXAMPLE 1.—THAM SALICYLATE
$$[(CH_2OH)_3CNH_2 \cdot C_7H_6O_3]$$

Mix 1.5 gm. salicylic acid and 1.2 gm. THAM dissolved in 2 ml. of ethyl alcohol. Heat for 3 minutes at boiling temperature of alcohol (70° C.). Cool to room temperature and add 3 ml. of ether to precipitate salt. Separation by filtering through Buchner funnel. White crystal, soluble in water.

Therapeutic use: In 2–20% lotion or ointment as an antiseptic in topical application.

EXAMPLE 2.—THAM ACETYLSALICYLATE
$$[(CH_2OH)_3CNH_2 \cdot CH_3COOC_6H_4COOH]$$

(3.6 gm. of acetylsalicylic acid and 2.4 gm. of THAM dissolved in 5 ml. of $H_2O$ and heated for 3–5 minutes)

Mixture is cooled to 0° C. and precipitate appears. Separation by filtering through Buchner funnel. White crystal soluble in water.

Therapeutic use: Analgesic and antirheumatic agent. Administration by mouth as a tablet or in a syrup, 1–10 gm. daily. Intravenously as a 0.3 molar solution.

EXAMPLE 3.—THAM barbital
$[(CH_2OH)_3CNH_2.C_8H_{12}N_2O_3]$ (2.6 gm. of barbituric acid and 2.4 gm. of THAM dissolved in 10 ml. of $H_2O$)

Heat for 3–5 minutes to boiling point of solvent (100° C.). Cool down to 0° C. and the precipitate appears. Separate by filtering through Buchner filter. White crystal soluble in water.

Therapeutic use: Sedative and hypnotic. Administration by mouth as a tablet or a syrup (.03–0.1 gm.) daily. Intravenously as a sterile 0.3 molar solution for anesthesia (0.5–1.5 gm.).

EXAMPLE 4

THAM thiopental $[(CH_2OH)_3CNH_2.C_{11}H_{17}O_2S]$ can also be made in a similar way and has the same therapeutic applications as THAM barbital.

EXAMPLE 5.—THAM ASCORBATE
$[(CH_2OH)_3CNH_2.C_6H_8O_6]$ (1.2 g. of THAM is added to 1.76 gm. of ascorbic acid and dissolved in 5 ml. of $H_2O$)

The salt is precipitated by addition of ethanol. This white crystal salt is soluble in water.

Therapeutic use as a vitamin and as an anti-oxydant. Administration as a tablet, 0.1 to 1 gm. orally, or in a sterile solution for intravenous therapy.

Another feature of this invention is the provision of novel THAM metal complexes, for example, such as THAM aluminum, THAM copper and THAM zinc. These metal complexes are formed by combining a solution of THAM with a solution of an appropriate metallic salt. In this case THAM acts as a chelate. The formation of a metal chelate of a weak base is usually accompanied by the displacement of one or more acidic protons of the chelating agent by a metal ion, causing a drop in the pH of the solution.

For example:

$2[(CH_2OH)_3CNH_3^+] + Al^{++} \rightleftharpoons$

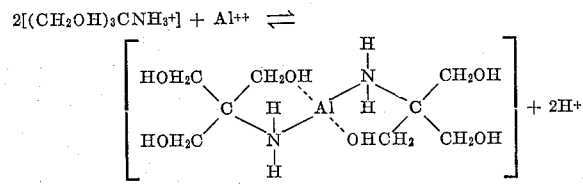

$+ 2H^+$

The reaction between a chelating agent and a metal salt will come to an equilibrium without completion of reaction because of the increase in acidity in solution during chelate formation. To overcome this difficulty, controlled pH must be used either by buffering the solution or by gradually adding a base, preferably a weak base such as ammonia. However, the pH should be maintained below a critical value where a metal hydroxide or basic salt might contaminate the product.

A 0.1 M of tris (hydroxymethyl)amino methane (THAM) is added to 1 M metal nitrate or perchlorate solution. The pH of the solution is raised slowly and with stirring by the dropwise addition of 1:1 ammonia. In all cases the pH at which the metal chelate precipitates is below the pH at which hydrolysis of the metal ion occurs (4.0–6.0). For example, a large amount of aluminum chelate precipitates at pH about 5.0. The resulting solution is warmed on a water-bath until the precipitate coagulates. The solution is filtered and the precipitate washed with water and ethanol. The chelate is dried in a vacuum dessicator to constant weight.

EXAMPLE 6.—THAM ALUMINUM
$[[(CH_2OH)_3CNH_2]_2Al]$

This complex can be prepared according to the general method mentioned above. It can also be formed in the body when a composition of matter containing THAM and aluminum hydroxide is administered orally and comes into contact with the hydrochloric acid contained in the stomach. Such a composition of matter would contain:

EXAMPLE 7

| | Mg. |
|---|---|
| THAM sulfate $[(CH_2OH)_3CNH_2.H_2SO_4]$ | 250 |
| THAM base $[(CH_2OH)_3CNH_2]$ | 250 |
| Aluminum hydroxide $[Al(OH)_3]$ | 500 | for a one gram tablet, 5 times a day against gastric acidity. The same composition of matter could be made as a syrup using identical proportions of active ingredients.

Examples of additional metal complexes that may be formed in accordance with this invention is THAM zincate $[[(CH_2OH)_3CNH_2]_2Zn]$. This compound is formed by combining THAM and zinc nitrate according to the general method described above.

Therapeutic application: As an astringent and antiseptic for medical and veterinary use.

THAM copper $[[(CH_2OH)_3CNH_2]_2Cu]$ is another metal complex of THAM which is useful for topical application as an antiseptic for medical and veterinary usage.

A further aspect of this invention is the provision of a novel THAM salt, namely THAM hydrofluoride $[(CH_2OH)_3CNH_2.HF]$, which may be prepared by the general method described hereinbefore, with respect to the reaction between THAM and an acid, and may be used as a dentifrice additive, e.g., 0.2–0.4% solution of a pH 8.0.

This invention in its broader aspects is not limited to the specific steps, methods and compositions described, but departures may be made therefrom within the scope of the accompanying claims without departing from the principles of the invention and without sacrificing its chief advantages.

What is claimed is:

1. A THAM salt or metal complex selected from the group consistnig of THAM barbital, THAM thiopental, THAM ascorbate and THAM aluminum.

2. A THAM salt according to claim 1 which is selected from the group consisting of THAM barbital.

3. A THAM salt according to claim 1 which is selected from the group consisting of THAM thiopental.

4. A THAM salt according to claim 1 which is selected from the group consisting of THAM ascorbate.

5. A THAM metal complex according to claim 1 which is selected from the group consisting of THAM aluminum.

No references cited.

ALEX MAZEL, *Primary Examiner.*

M. U. O'BRIEN, *Assistant Examiner.*